US011934429B2

(12) United States Patent
Ubalde et al.

(10) Patent No.: US 11,934,429 B2
(45) Date of Patent: *Mar. 19, 2024

(54) WEB BASED INTERACTIVE GEOGRAPHIC INFORMATION SYSTEMS MAPPING ANALYSIS AND METHODS FOR IMPROVING BUSINESS PERFORMANCE INCLUDING FUTURE SCENARIO MODELING

(71) Applicant: SIZEUP, INC., El Cerrito, CA (US)

(72) Inventors: Anatalio C. Ubalde, El Cerrito, CA (US); Juan Pablo Monzon-Perez, El Cerrito, CA (US); Thomas Watson, El Cerrito, CA (US); Eric Simundza, El Cerrito, CA (US)

(73) Assignee: SIZEUP, INC., El Cerrito, CA (US)

(*) Notice: Subject to any disclaimer, the term of this patent is extended or adjusted under 35 U.S.C. 154(b) by 79 days.

This patent is subject to a terminal disclaimer.

(21) Appl. No.: 17/373,591

(22) Filed: Jul. 12, 2021

(65) Prior Publication Data

US 2021/0382921 A1 Dec. 9, 2021

Related U.S. Application Data

(63) Continuation of application No. 12/877,992, filed on Sep. 8, 2010, now Pat. No. 11,061,938, which is a
(Continued)

(51) Int. Cl.
*G06F 16/29* (2019.01)
*G01C 21/26* (2006.01)
(Continued)

(52) U.S. Cl.
CPC ............ *G06F 16/29* (2019.01); *G01C 21/26* (2013.01); *G06F 16/24578* (2019.01); *G06F 16/9537* (2019.01); *G06Q 30/0205* (2013.01)

(58) Field of Classification Search
CPC ................ G06Q 30/02; G06Q 30/0205; G06F 16/24578; G06F 16/9537; G06F 16/29; G01C 21/26
(Continued)

(56) References Cited

U.S. PATENT DOCUMENTS 5,559,707 A 9/1996 DeLorme et al.
6,026,381 A 2/2000 Barton, III et al.
(Continued)

OTHER PUBLICATIONS

Jakob et al., DCbot: exploring the Web as value-added service for location-based applications, Apr. 5-8, 2005, IEEE, 2 pages.
(Continued)

*Primary Examiner* — Phong H Nguyen
(74) *Attorney, Agent, or Firm* — Manatt, Phelps & Phillips, LLP

(57) ABSTRACT

A web based interactive geographic information systems mapping analysis and methods for improving business performance including future scenario modeling are provided. The system uses a radical efficiency model to increase profitability since competitiveness can be improved by the radical efficiency model that allows businesses to reduce money wasted on bad initiatives. The system also gives businesses competitive intelligence on how to find new markets (expanding the pie) and to capitalize on competitors' inefficiencies and weaknesses to capture the competitors' market share (eating the competitor's slice of the pie). The system also shows businesses how to make more money by maximizing their strategic advantages against competitors and by identifying the best places and recommended strategies for business growth. The system also expands the list of potential vendors and customers a business can buy from and sell to. The system also provides advertisement recommendations for the business.

18 Claims, 11 Drawing Sheets

Related U.S. Application Data continuation-in-part of application No. 11/903,832, filed on Sep. 24, 2007, now Pat. No. 7,945,582.

(60) Provisional application No. 61/240,567, filed on Sep. 8, 2009, provisional application No. 60/846,494, filed on Sep. 23, 2006.

(51) Int. Cl.
*G06F 16/2457* (2019.01)
*G06F 16/9537* (2019.01)
*G06Q 30/0204* (2023.01)

(58) Field of Classification Search
USPC .................................. 707/723, 724, 748
See application file for complete search history.

(56) References Cited

U.S. PATENT DOCUMENTS

| | | | |
|---|---|---|---|
| 6,236,975 B1 | 5/2001 | Bae et al. | |
| 6,324,538 B1 | 11/2001 | Wesinger, Jr. et al. | |
| 6,601,057 B1 | 7/2003 | Underwood et al. | |
| 6,636,803 B1 | 10/2003 | Hartz et al. | |
| 6,735,568 B1 | 5/2004 | Buckwalter et al. | |
| 6,850,940 B2 | 2/2005 | Wesinger, Jr. et al. | |
| 6,871,140 B1 | 3/2005 | Florance et al. | |
| 6,970,929 B2 | 11/2005 | Bae et al. | |
| 7,028,034 B2 | 4/2006 | Wesinger, Jr. et al. | |
| 7,069,232 B1* | 6/2006 | Fox | G06Q 30/02 705/7.34 |
| 7,152,207 B1 | 12/2006 | Underwood et al. | |
| 7,269,591 B2 | 9/2007 | Wesinger, Jr. et al. | |
| 7,747,648 B1 | 6/2010 | Kraft et al. | |
| 7,860,519 B2 | 12/2010 | Portman et al. | |
| 7,912,865 B2 | 3/2011 | Akerman et al. | |
| 7,945,582 B2 | 5/2011 | Ubalde et al. | |
| 7,970,648 B2 | 6/2011 | Gailey et al. | |
| 9,298,738 B2 | 3/2016 | Ubalde et al. | |
| 10,488,860 B1 | 11/2019 | Koch et al. | |
| 11,061,938 B2 | 7/2021 | Ubalde et al. | |
| 2001/0042037 A1* | 11/2001 | Kam | G06Q 20/0855 705/36 R |
| 2003/0115195 A1 | 6/2003 | Fogel et al. | |
| 2003/0230523 A1 | 12/2003 | Polizzotto et al. | |
| 2004/0236620 A1 | 11/2004 | Chauhan et al. | |
| 2005/0015269 A1 | 1/2005 | Polizzotto | |
| 2006/0075442 A1 | 4/2006 | Meadow | |
| 2006/0123022 A1 | 6/2006 | Bird | |
| 2007/0173956 A1 | 7/2007 | Koch et al. | |
| 2007/0226374 A1* | 9/2007 | Quarterman | G06Q 30/02 709/250 |
| 2007/0244634 A1 | 10/2007 | Koch et al. | |
| 2007/0299785 A1 | 12/2007 | Tullberg | |
| 2008/0010131 A1 | 1/2008 | Bridges et al. | |
| 2008/0064019 A1 | 3/2008 | Kaufman et al. | |
| 2008/0077551 A1* | 3/2008 | Akerman | G06Q 40/00 707/999.001 |
| 2008/0097768 A1 | 4/2008 | Godshalk | |
| 2008/0120251 A1 | 5/2008 | Tyagi et al. | |
| 2008/0133488 A1 | 6/2008 | Bandaru et al. | |
| 2008/0162238 A1 | 7/2008 | Subbu et al. | |
| 2010/0118049 A1 | 5/2010 | Bobrow et al. | |
| 2011/0161137 A1* | 6/2011 | Ubalde | G06F 16/9537 705/7.34 |
| 2011/0161337 A1 | 6/2011 | Matsugashita | |
| 2016/0054865 A1 | 2/2016 | Kerr et al. | |

OTHER PUBLICATIONS

Wang et al., Integrating multiple Web-based geographic information systems, Aug. 6, 2002, IEEE, vol. 6, 49-61, 13 pages.

\* cited by examiner

FIG. 2

Size Up

ABOUT  FAQ  CONTACT  [SIGN IN]

- EVALUATE MY BUSINESS — PERFORMANCE & COMPETITIVENESS
- FIND PLACES — FOR YOUR BUSINESS
- TOP 100 LISTS — OF BUSINESSES & COMMUNITIES
- MAP — BUSINESSES & PLACES

BACK

MY BUSINESS PERFORMANCE

COMPARE TO YOUR COMPETITORS  COMPARE TO COMMUNITIES  INDUSTRY NAME 000000

- MY BUSINESS [EDIT]
  JILL'S CONFECTIONS
  SAVANNAH
  CHATHAM
  SAVANNAH
  GEORGIA

ADD COMMUNITY
SEE HOW YOUR BUSINESS WOULD STACK UP IN A DIFFERENT COMMUNITY

ADD COMPETITOR
FIND OUT HOW YOU STACK UP TO YOUR DIRECT COMPETITION.

AVERAGE ANNUAL REVENUE

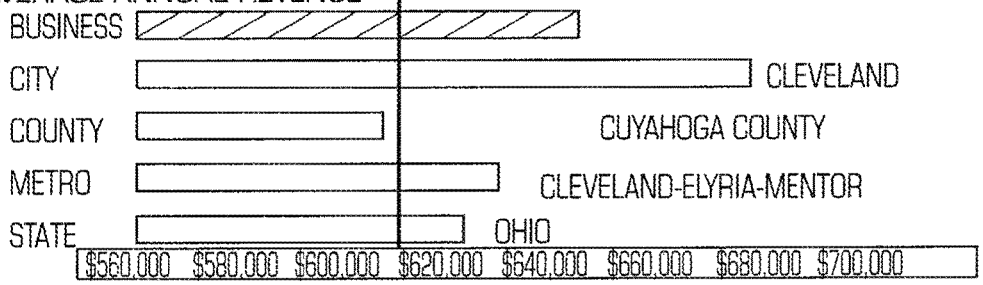

☐ SLAM DUNK SPORTS   | NATIONAL AVG.

RAISE AWARENESS
SLAM DUNK SPORTS IS OVERPERFORMING IN RELATION TO THE COUNTY, METRO, AND STATE, BUT UNDERPERFORMING IN RELATION TO THE CITY. WITHIN THE CITY OF PORTRAITS BY JANE SHOULD TRY TO DIFFERENTIATE FROM COMPETITORS WHILE AT A LARGER SCALE THE BUSINESS SHOULD TRY TO RAISE AWARENESS OF THE PRODUCTS AND SERVICES.

TOP CITIES

REVENUE/PRODUCTIVITY/EMPLOYEE

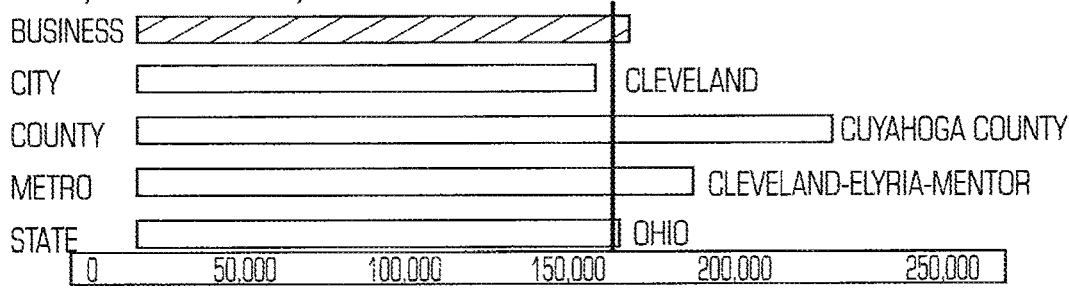

☑ SLAM DUNK SPORTS   | NATIONAL AVG.

EXPANDING/RELOCATING
SLAM DUNK SPORTS HAS A HIGHER PRODUCTIVITY PER EMPLOYEE THAN THE CITY, BUT A SUBSTANTIALLY LOWER PRODUCTIVITY THAN THE COUNTY. SLAM DUNK SPORTS MAY WANT TO CONSIDER EXPANDING/RELOCATING TO OTHER AREAS OF THE COUNTY WHERE LABOR COSTS MAY BE LOWER AND/OR WORKERS MAY BE MORE EFFICIENT.

FIG. 4

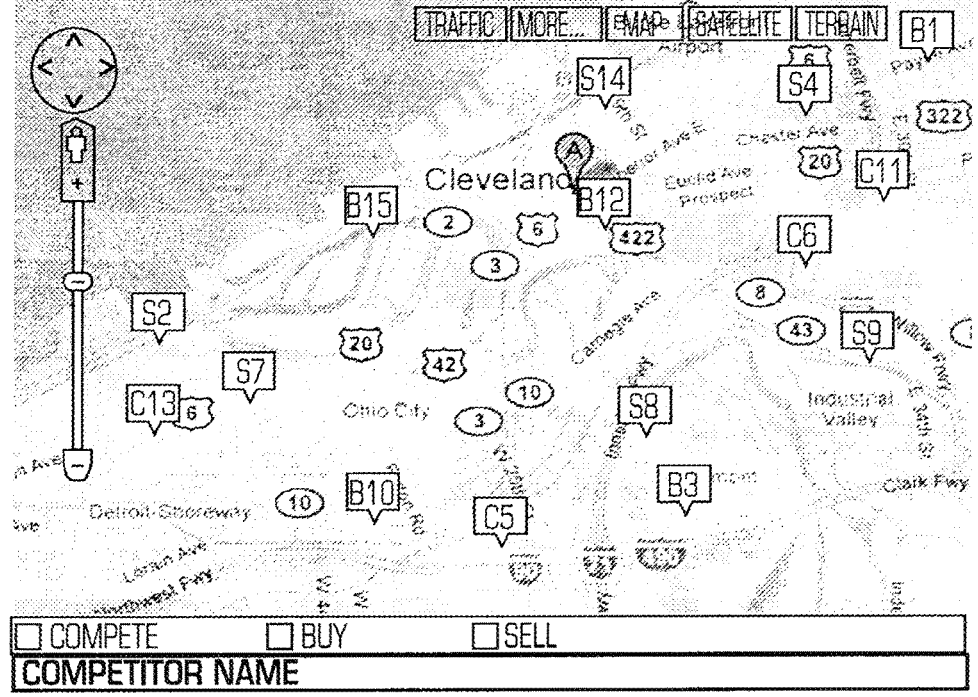

BUSINESSES YOU COMPETE WITH BUY FROM AND SELL TO

☐ COMPETE    ☐ BUY    ☐ SELL

COMPETITOR NAME
1. COMPETITOR NAME
2. COMPETITOR NAME
3. COMPETITOR NAME
4. VIEW REPORT
5. COMPARE TO MY BUSINESS
6. COMPETITOR NAME
7. COMPETITOR NAME
8. COMPETITOR NAME

BUYERS NAME
1. BUYER NAME
2. BUYER NAME
3. BUYER NAME
4. BUYER NAME
5. BUYER NAME
6. BUYER NAME
7. BUYER NAME
8. BUYER NAME

SELLER NAME
1. SELLER NAME
2. SELLER NAME
3. SELLER NAME
4. SELLER NAME
5. SELLER NAME
6. SELLER NAME
7. SELLER NAME
8. SELLER NAME

FIG. 5

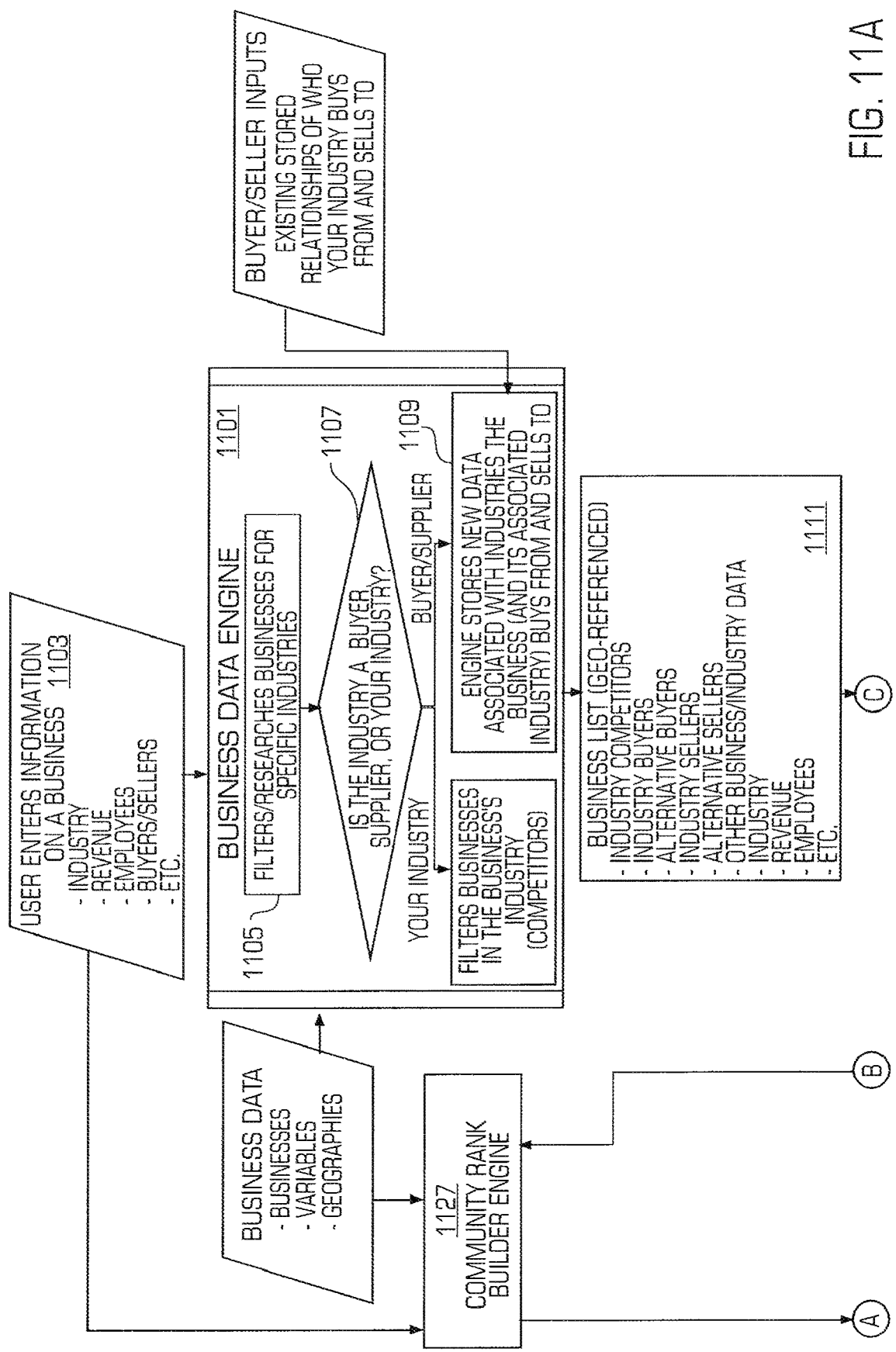

WEB BASED INTERACTIVE GEOGRAPHIC INFORMATION SYSTEMS MAPPING ANALYSIS AND METHODS FOR IMPROVING BUSINESS PERFORMANCE INCLUDING FUTURE SCENARIO MODELING

PRIORITY CLAIMS/RELATED APPLICATIONS

This patent application is a continuation of and claims priority under 35 USC 120 to U.S. patent application Ser. No. 12/877,992 filed Sep. 8, 2010 that claims the benefit, under 35 USC 119(e) and 120, to U.S. Provisional Patent Application Ser. No. 61/240,567 filed on Sep. 8, 2009 and entitled "Web Based Interactive Geographic Information Systems Mapping Analysis And Methods For Improving Business Performance Including Future Scenario Modeling", the entirety of which is incorporated herein by reference. In addition, this application is a continuation in part of and claims priority under 35 USC 120 to U.S. patent application Ser. No. 11/903,832, filed on Sep. 24, 2007 and entitled "Web-Based Interactive Geographic Information Systems Mapping Analysis and Methods of Using Thereof" which in turn claims the benefit under 35 USC 119(e) of U.S. Provisional Patent Application Ser. No. 60/846,494 filed on Sep. 23, 2006 entitled "Web-Based Interactive Geographic Information Systems Mapping Analysis and Methods of Using Thereof" and the entirety of all of which are hereby incorporated by reference.

FIELD OF THE INVENTION

The present invention relates to web-based geographic information systems for allowing a business to determine its opportunities and its deficiencies, so it can respond with action to perform better than its competitors.

BACKGROUND OF THE INVENTION

For success, businesses need a much higher level of geographic data accuracy than is currently provided on the major search engine map websites. Local governments have extremely accurate geographic layers of data which is both relevant for people and businesses, but this data has been locked away in the computers of government engineers. Our invention democratizes information by liberating data from hidden or inaccessible data sources like the government and providing data visualization and comparison to everyone with an Internet connection, using massive amounts of data and multiple data sets to crunch numbers and provide businesses with information and analysis they could not easily get to, or make sense of on their own. Our invention makes businesses smarter though individual data, robust national or worldwide data sets, and algorithmic computation.

Our invention gives entrepreneurs a deep view into how to best position their businesses strategically, competitively and geographically. It provides them with ways of seeing how they can grow their business in ways they couldn't visualize before and frees them to spend more time on the core value proposition of their unique business. As only one example of many to be discussed below, by seeing the zoning of various locales, businesses can know where they are allowed to open a business. Or, by being located in a local or federal incentive zone the business can save thousands of dollars each year in tax breaks.

Our invention has access to enormous amounts of both public and non-public data through client partnerships with state and local government and economic development organizations across the USA. Further, our invention can aggregate many important data sets consistently across the world, which will breakdown the persistent business barriers of information scarcity and difficult business intelligence gathering in developing countries to reduce poverty, enable self-reliance for business planning, and promote entrepreneurship. From a business partnership perspective, there is a large ecosystem of business partners that can be integrated within our system, and into whose business model our system can be integrated. A few examples include companies that provide company reviews, business social networks, targeted marketing list, job listings, business valuation, news, small business services, search websites, sell companies, available properties, news, financing, business supplies, credit services, financial advising, franchising, and the like. In addition there are various ways to make money through revenue sharing, direct sales on one's website, and through expanding our system's existing business model of selling website services to local and state economic development organizations.

Our invention is an automated, online consulting application that uses the above data to help to optimize businesses by showing them how to improve performance by identifying the best markets/places for their business and how to position themselves strategically and competitively. While the details of how to execute a company's marketing strategy may require creative advertising agencies, the fundamentals of positioning and marketing a business locally can be calculated mathematically, using the above data. Our invention uses its algorithms to explain the essential marketing strategies a business should consider. As an example, our invention enables businesses to perform a side-by-side, apples-to-apples competitiveness comparison of their business and competitors, based on numerous business, employee, location, and industry performance variables. This enables each business to see its opportunities and deficiencies so it can respond with action to perform better than its competitors.

People and companies are interested in seeing performance information about whom they buy from, sell to, and even the companies their friends own or work for. This behavior has been seen in other websites like Zillow where neighbors are just as interested in how much their neighbors' homes are worth as they are in their own house's value. Likewise, entrepreneurs may want to find opportunities for creating businesses in underserved industries right in their own community. Our invention algorithmically identifies the places that are the highest performing or most underserved using the above data, so that businesses can immediately identify market opportunities geographically.

Small businesses are at a competitive disadvantage compared to big businesses because they don't have access to the same quality information to enable success. Among other things, access to this information allows big businesses to identify the best customer markets, best locations to do business, and which businesses to do business with. They do this through the economy of scale of internal resources or the financial strength to hire expert consultants. Small businesses don't have this option and make too many decisions without good information, which results in a higher likelihood they will fail. Thus, the user audience that can profit most from our invention is the small and medium size business (SMB/SME) market, which includes businesses with revenue of less than $250M per year that make up 99.99% of all businesses in the USA. This is a highly underserved segment of the business market of information have-nots because many cannot afford business consulting or assistance. Our invention can serve them by replacing their unreliable gut decisions with powerful, quantitative business intelligence. This intelligence enables recommendations, based on the user's need as identified through our invention, of additional services from our partners once the user has experienced initial value. Stated another way, too many small businesses fail because they don't have access to easily understandable information about where to locate their business and how to position their business for success, knowing where and how to be successful. While risk is a part of entrepreneurship and some businesses should fail. But they should fail because they have a bad idea or poor business model. They should not fail because the business opens in the wrong location or they don't know how to position their company competitively or strategically. Our invention can limit the likelihood of failure in the above areas by providing many of the same demographic, geographic, business, industry, transportation, and cost-of-business data to all businesses using powerful analytic search tools to enable all businesses to make smarter decisions.

No two businesses are alike, although many businesses share common opportunities and challenges. Our invention enables each business to search for exactly the information relevant to it, and provides customized business intelligence reports as unique as that business. Imagining what a company's future performance would be like if things changed for the business or its competitors could provide strategic direction for a business' forecasting and planning. Our invention provides competitive company scenario modeling, sometimes called "futuring," based on fundamental business assumptions. The calculations and analysis are based on our extensive data sets, algorithms and input from the business using the website by which our invention can be accessed.

By using our invention, businesses will no longer have to rely on their rolodex, industry association contacts, or lead-generation list marketing companies to understand whom they can buy from and sell to. The invention creates visual lists of businesses of potential buyers and sellers that are geographically based. This provides spatial insights on how to best serve existing customers and how to find new customers. It also shows visual information and lists about suppliers to buy from. Our invention creates "recommended sellers and customers" based on the behaviors of industries. Stated another way, it provides businesses the ability to expand the ability to find additional sellers and buyers, to expand the service to provide a platform for businesses to sell their goods/services to other businesses/consumers that our invention identifies as being potential buyers. This works in both the buying and selling direction as businesses can have buying opportunities presented to them and also be directed to ways they can advertise their products to potential buyers. This is not based on keyword search (although it could do that too) but on the industry the businesses buy and sell from. This can be accomplished either individually or through a combination of efforts including individual selling accounts using our invention, or through partnerships with search engines (for example, Google can produce a comparative search for products when a product name is entered into its search engine or though Google Product Search), product aggregators (for example, Amazon, GoogleBase) or Business-to-Business ("B2B") buying sites (for example, Alibaba.com).

Most importantly, everyone is limited by not knowing what they don't know. Our invention provides information to businesses that they don't know they need, but which can make their businesses more successful. And it's provided in an easy to understand way that visually shows the problems and opportunities and explains them. For example, every time a company does business with another company there is risk that it won't get what it pays for or will get poor quality products or services. Through use of our invention, business users will be able to receive user-reviews of businesses, and perform due-diligence on other companies to analyze their credit-worthiness and license status. This decreases the risk associated with doing business with other companies.

As this patent application is filed, a recession is devastating industries, workers and communities. Our invention provides data that guides displaced workers to other industries they can work in and directs recession-impacted communities to industries they should invest in for economic and employment assistance to their residents. Also, now more than at any time in the past seventy years, banks and investors want to know what the company's plan is and that information is often found in a business plan. The data analysis and reports in our invention provide market and competitive intelligence which can be placed directly into a business plan.

Further, our invention can generate top 100 cities lists for every industry across the USA based on a variety of measurement indexes. Like magazines that create a "best places for business" list each year, our invention can automatically generate a statistically accurate top 100 list for every one of them. That means there are 12,000 industry-specific magazines that could write articles about our technology's lists for each industry 12,000 times a year. We can also produce top 100 businesses for each industry across a variety of competitiveness indexes.

Major search engines put ads in front of users based on the keywords searched, or the website network selected by the advertiser, or the physical location of users in which the advertiser wants the ads to show up. But to provide a higher likelihood of click-through on the ads and to fill the empty advertising space on pages without keyword matches, the search engines need to know how to hyper-target the user based on the ideal customer of the advertiser and based on the geographic areas that are most over/underserved in a specific market and the customer profile. The data in and created by our invention provides this information across all geographies and industries, which should result in better ad placements and click-through for search engines.

The data gathered through businesses using our invention will provide economic insight into macro and micro trends happening in the economic market place. In addition it will enable companies interested in business behavior to better understand what businesses want, need, think about, and are considering taking action on. Our invention makes businesses smarter, more profitable, and more competitive through search technology with a result of creating better communities and fostering job creation and economic development.

SUMMARY OF THE INVENTION

In one embodiment, our invention uses a radical efficiency model to increase profitability. Improving competitiveness is achieved not only by taking revenue from one's competitors (the pie is one size). Competitiveness can also be improved by our radical efficiency model that allows businesses to reduce money wasted on bad initiatives. By doing so, that revenue becomes profit (the pie is the same size but there's more profit in it). In this model of radical efficiency it's possible to be more profitable even making less revenue by using our invention's analysis to target resources to the best opportunities.

In another embodiment, the data analysis in our invention gives businesses competitive intelligence on how to find new markets (expanding the pie) and to capitalize on competitors' inefficiencies and weaknesses to capture the competitors' market share (eating the competitor's slice of the pie).

In still another embodiment, our invention shows businesses how to make more money by maximizing their strategic advantages against competitors and by identifying the best places and recommended strategies for business growth.

In yet another embodiment, our invention expands the list of potential vendors and customers a business can buy from and sell to.

BRIEF DESCRIPTION OF THE DRAWINGS

The present invention can be more fully understood from the following detailed description and the accompanying drawings which forma part of this application.

FIG. 2 depicts an interactive input form used to provide input information for our invention over the Internet.

FIG. 4 depicts an interactive report showing potential new markets for a given business, including various types of reports the user can select.

FIG. 5 illustrates an interactive report showing businesses the user competes with, can buy from, and can sell to in a given geographical area.

FIGS. 11A-11B illustrate an embodiment of our invention for building a complete business benchmarking report.

DETAILED DESCRIPTION OF THE DRAWING

Evaluating the User's Business's Competitiveness

In the discussion below, reference will be made to a national database. This can also include the process being applicable to global or world databases, but national is used in some cases for ease of reference. All processes will be operated by computer, and a computer programmer of ordinary skill in the art can code up our system based on the process steps disclosed herein.

Figure 1:
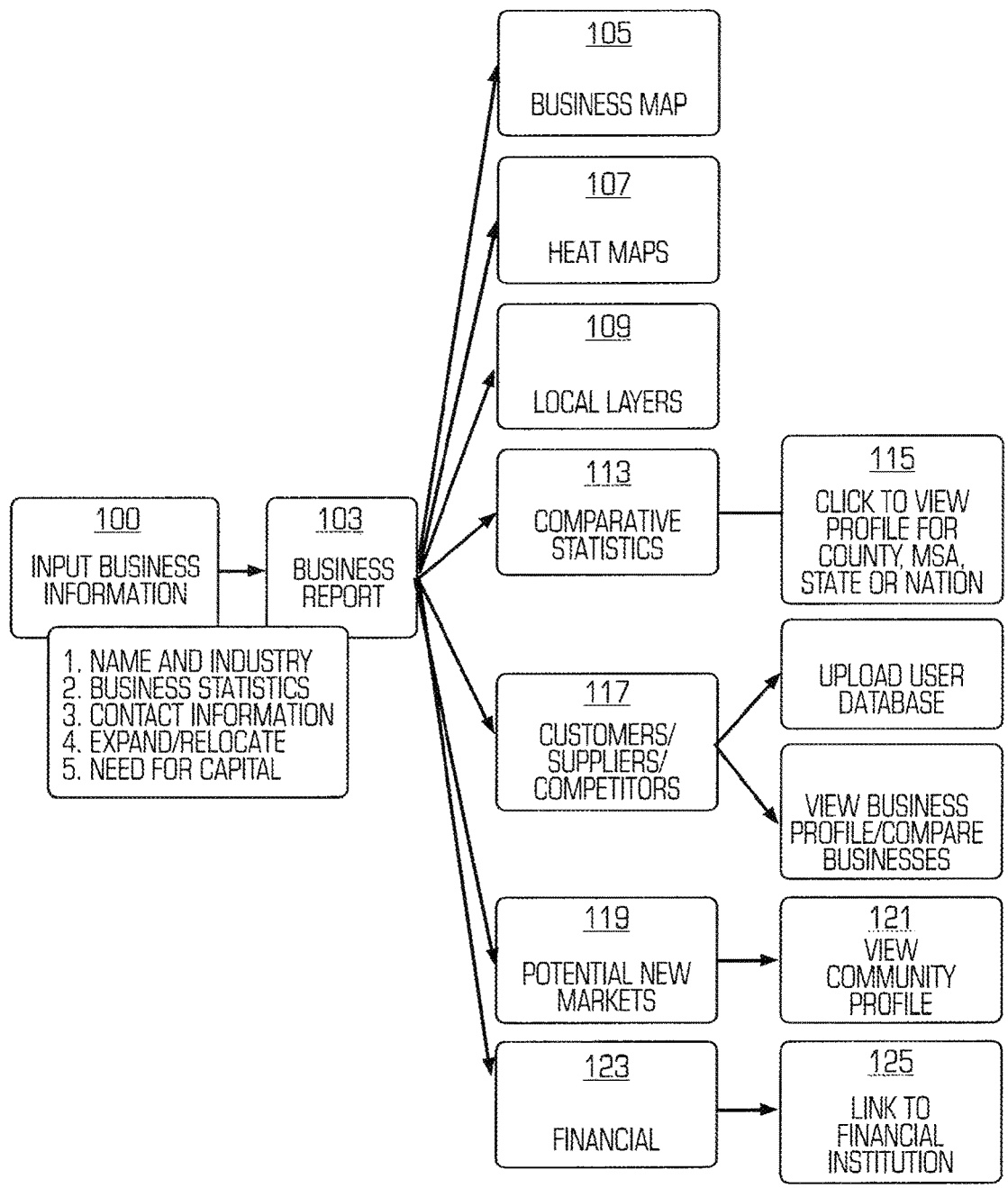
FIG. 1 depicts a logical layout of the type of report generated by our invention.
Figure 3:
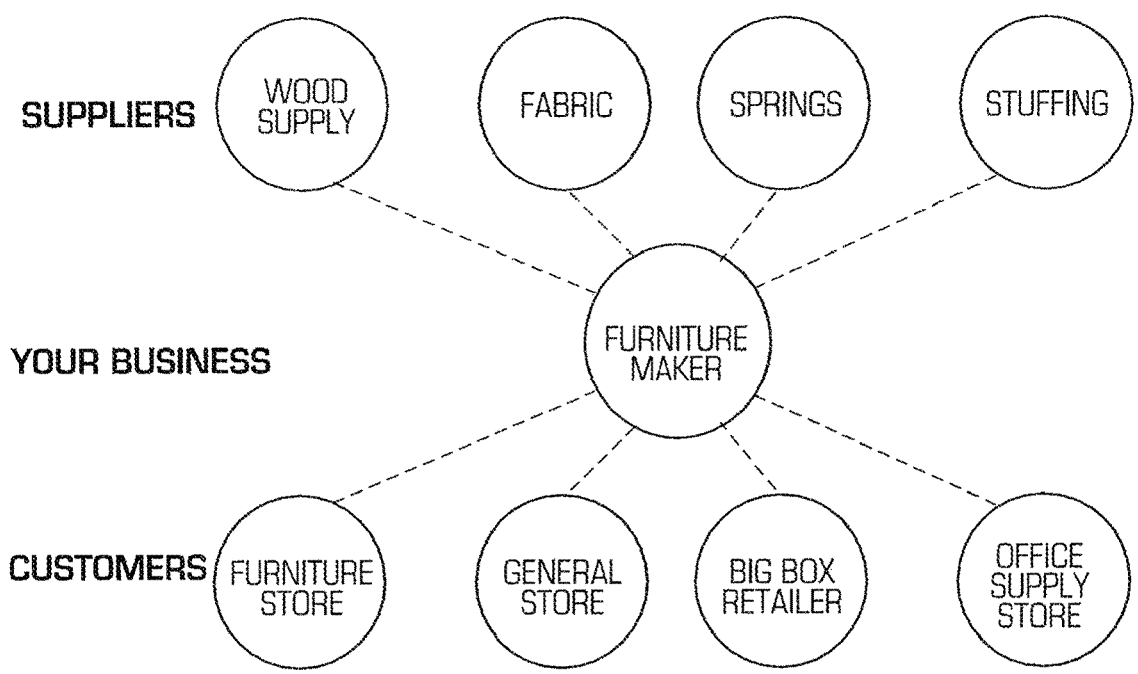
FIG. 3 depicts the relationship among suppliers and customers of a business.
Figure 6:
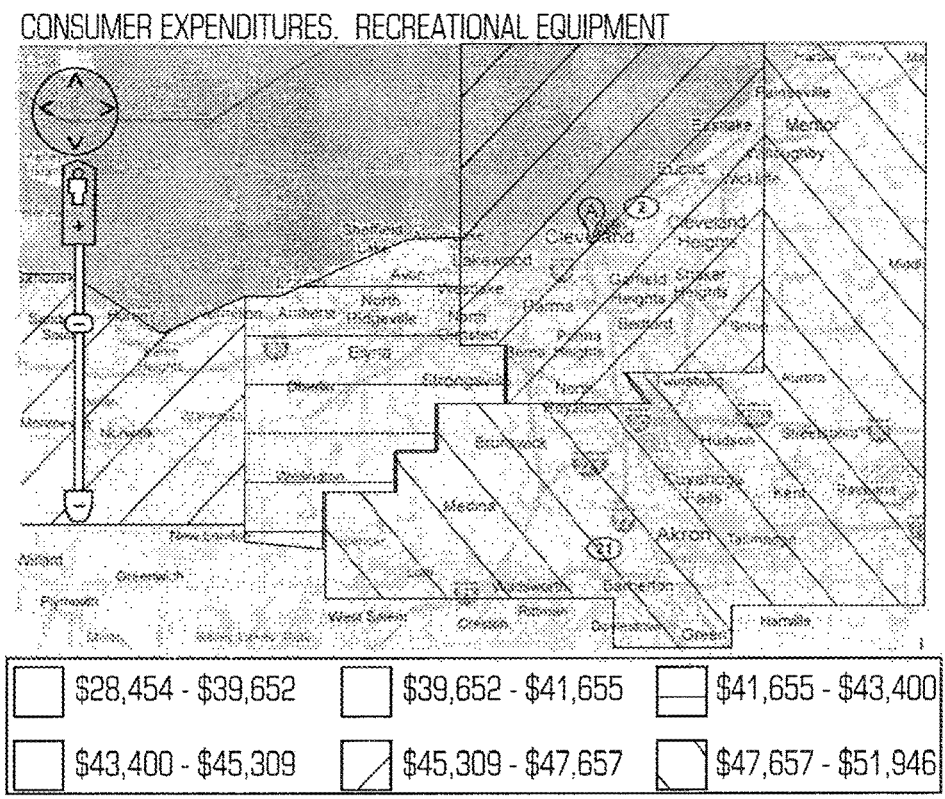
FIG. 6 illustrates a form of interactive report the user can use for determining certain aspects of a consumers in a given geographical area.
Figure 7:
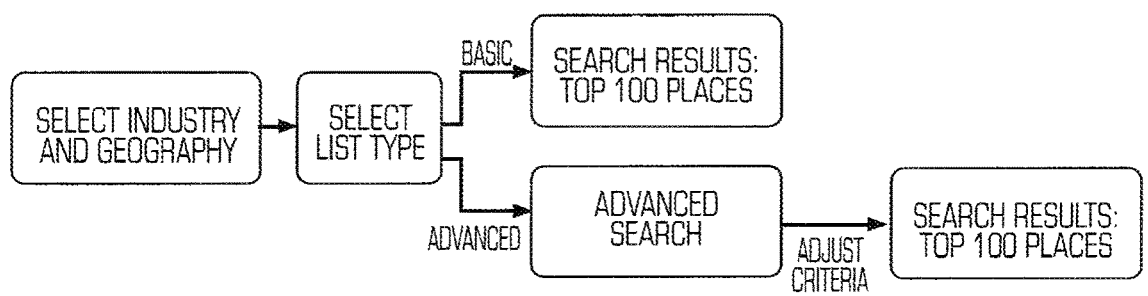
FIG. 7 illustrates an outline of finding a top 100 list.
Figure 8:
FIG. 8 illustrates an input form used to provide input information to allow our invention to provide recommendations for the best locations for a particular business, or a top 100 list.
Figure 9:
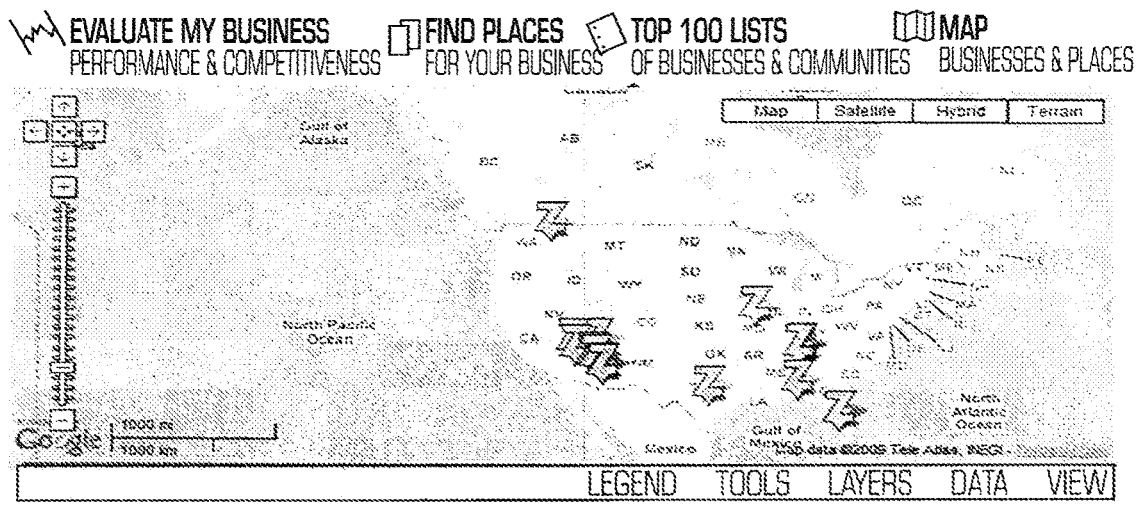
FIG. 9 illustrates a form of report showing a number of best locations for the user's business.
Figure 10:
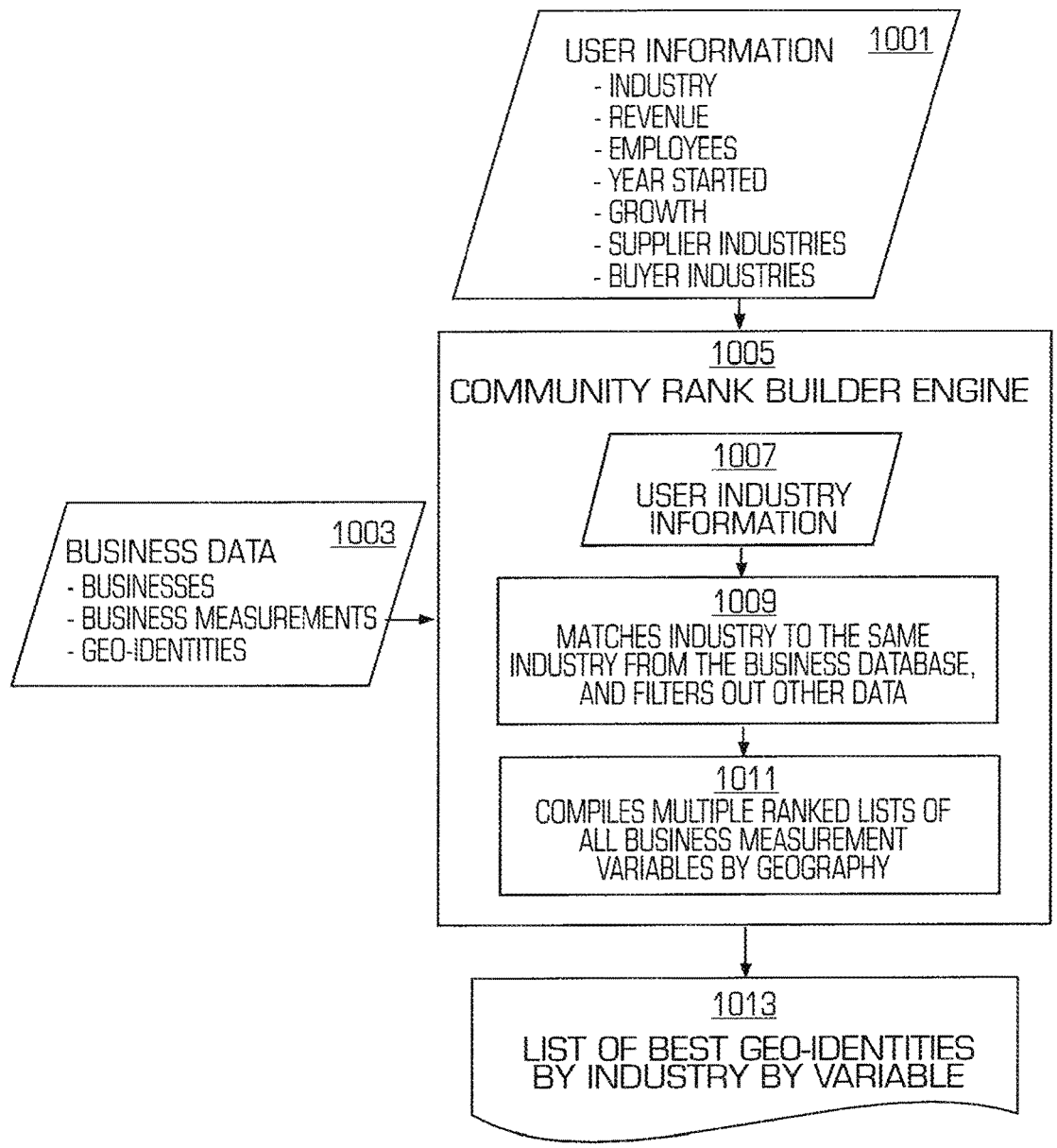
FIG. 10 illustrates an embodiment of our invention for building a community ranking for business.
Figure 11B:
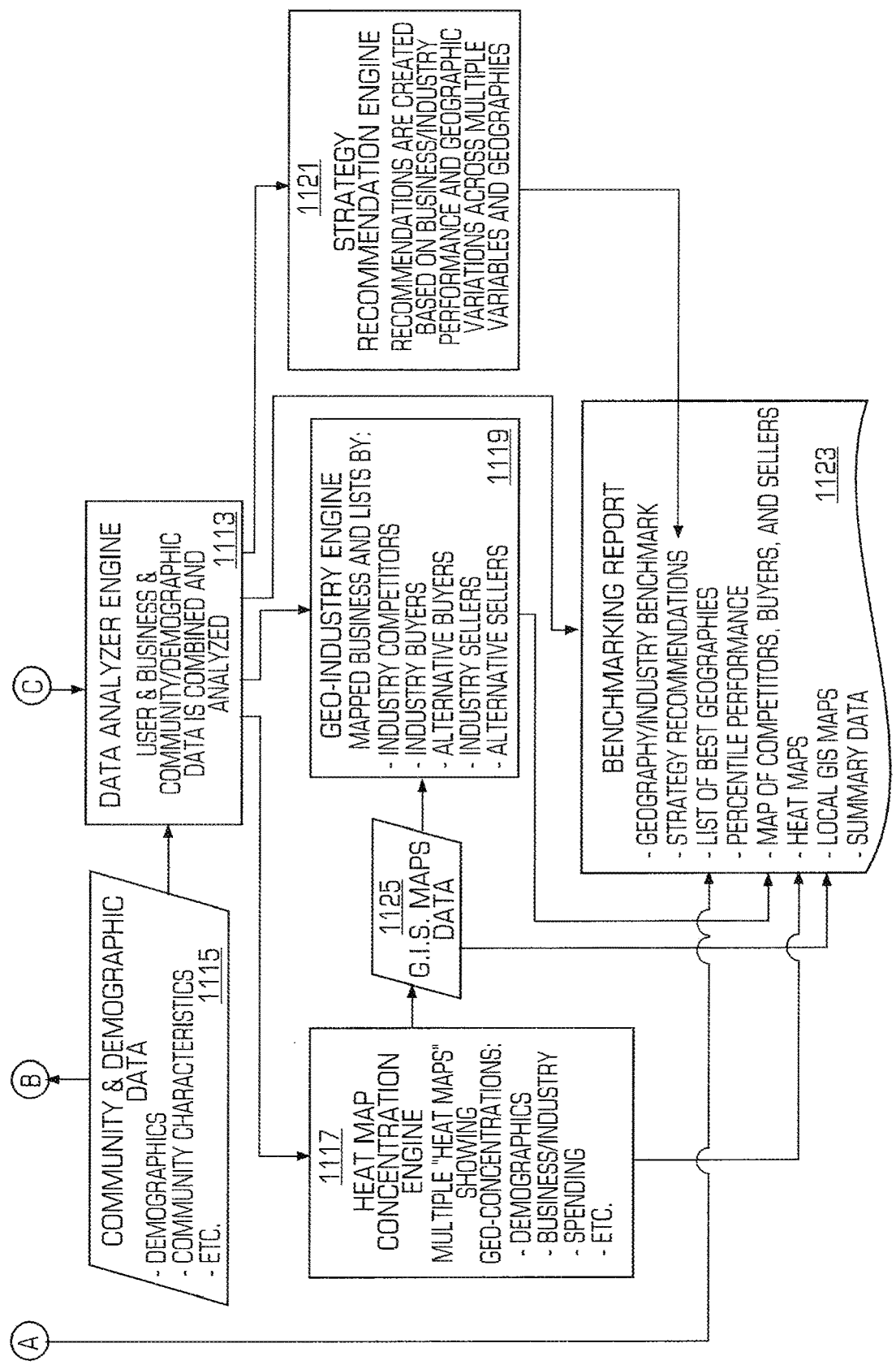

As depicted in FIG. 1, our invention will provide the user with an individualized report on their business that will help them to make important decisions about their competitive climate. The report will compare their revenue with the average for other businesses in their industry in the same city, county, metro (MSA), state and nationwide. The report will also map the concentration of similar businesses in the local area, and will recommend that the business either strive to differentiate itself in a competitive environment, or strive to raise awareness of the industry in an underserved market. The report will also recommend other suitable areas for expansion within the vicinity. In the first phase, the areas recommended will be cities, counties, and metro areas, and can even be narrowed down to more specific neighborhoods.

Figure 2:
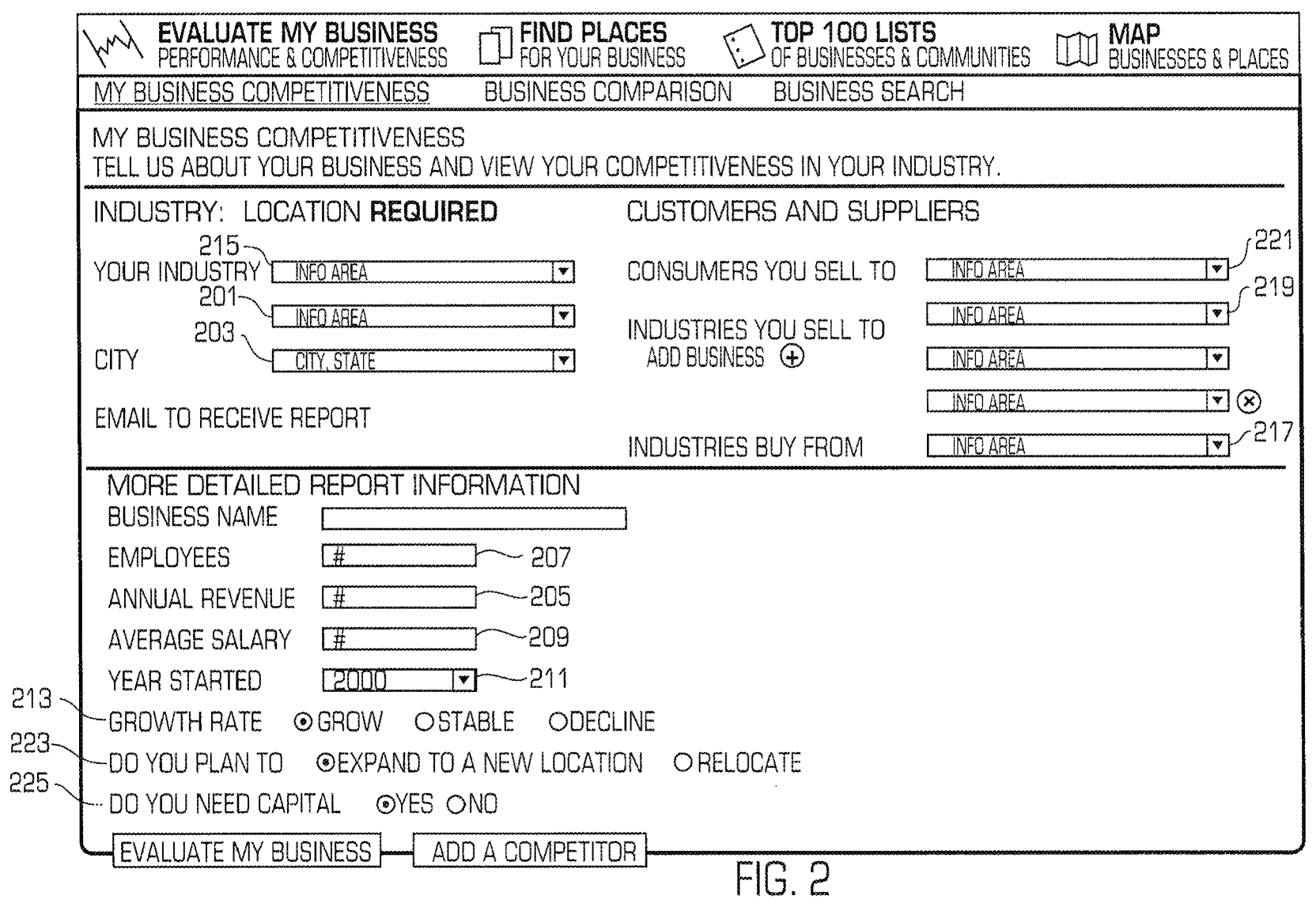

The user will, working from a computer with internet connection, access the software of our invention and input certain business information as seen at 1 of FIG. 1. This information, seen more specifically in FIG. 2, will include the following.

Name and Industry: The user will enter the name of their business. If the business's record is found within our database, the industry choice will be prepopulated, but correctable by the user. Otherwise, they will be able to save the name of their business and manually select the industry from the dropdown box. The dropdown box will provide the user with choices for 2 digits North American Industry Category System ("NAICS") codes. Each choice will expand to 3 digit NAICS choices, which in turn will expand to 4, 5, and 6 digit NAICS.

Business Statistics: The user will also input their own revenue, number of employees, growth rate, and year started.

Contact Information: The user will input their email so that they can receive the business report, which will be shared with our partners. The mailing address will be used to pinpoint the location for the business report, and will prepopulate if the business's information was already in the database.

Expand/Relocate: The user will then be asked if they plan to expand/relocate, and if they say either expand or relocate, the user will be prompted on a timeframe in years. This information will populate statistics that can be distributed to users of the site, including other businesses and economic development organizations interested in which businesses might be interested in them.

Need for Capital: Lastly, the user will be asked if they currently need capital for their business. If the user indicates a need for capital, their information will be sent to a partner financial institution.

Data Process

How Categories of Industries are Created, Searched and Filtered

Every business falls within a group of similar businesses into an industry category. Our system uses a variety of industry structures and combines them into a logical relational database structure which enables businesses to search for their industry using natural language. This enables them to query their business' industry through multiple industry taxonomies.

Our system started the process of defining industry search using best practices for industry taxonomies used in multiple public and private business data structures. However, we recognized that users don't think or search the way databases or institutions divide data. Users just want to search for an industry that makes sense to them the way they understand it. To address this issue we cross-reference multiple industry structures and then expand their definitions to be associated with related ways that people call the same business or industry by multiple names.

Graphic Information System Data

Geographic Information System (GIS) map data comes from multiple sources including public, publicly available, and private/proprietary data sources. For each of these types of data sources multiple forms of gathering data are often used. For example, some data can be accessed through searching the Internet. Other data must be requested from individual organizations with responsibilities for spatial data. Some data must be "scraped" using Internet "bots" which automatically gather publically available data from the Internet and then convert it into a GIS data format so it is useable and accessible through our system. Other data is accessed through licensing proprietary data sets. The most valuable and difficult GIS data to gather is the local GIS data "layers" that are created, maintained and managed by local, state and regional government or quasi-governmental organizations which create their own community data for use in public works, public safety, city planning, and other government-related uses but which are often not publically available to the general public. The other valuable and challenging GIS data to gather are the data developed and managed by public or private utilities and energy providers that maintain the data for engineering and business needs. We have partnerships with multiple government, quasi-governmental, and utility companies which provide their hyper-local GIS data for our use.

Through our research, technology, licenses, and government/utility partnerships we gather and then seamlessly aggregate this variety of data into geographically referenced, hyper-local visualization and analysis for the user.

Demographic and Community Data

Demographic and community data comes from multiple sources including public, publicly available, and private/proprietary databases. For each of these types of data sources multiple forms of gathering data are often used. For example, some data can be accessed through searching the Internet. Other data must be requested from individual organizations. Some data must be "scraped" using Internet "bots" which automatically gather publically available data from the Internet. Other data is accessed through licensing proprietary data sets. In addition many data sets come from local, state and regional government or quasi-governmental organizations which create their own community data for use in public works, public safety, city planning, and other government-related uses but which is often not publically available to the general public.

Similarly to the process discussed above for GIS data, through our research, technology, licenses, and government partnerships we gather and then seamlessly aggregate this variety of data into geographically referenced, hyper-local profiles for businesses and communities.

How Stored Relationships of Buyers and Sellers Works

Our system uses crowd-sourcing to become smarter about how to deliver the best data results to users, including information that they didn't even know they needed. The goal of this process is to expand the list of potential vendors and customers the business can buy from and sell to.

When a business uses our system they are requested to select the industry their business is in, the industry(s) they buy from, and the industry(s) and/or consumers they sell to. (The reason for the "and/or" is that If they are a B2B business they sell to an industry and if they are a Business-to-Consumer ("B2C") business they sell directly to people/customers). Our system takes this information and stores it in our database of historical searches. What this data is then used for is to compare and enhance the search results of a business in a specific industry.

For example, assume 100 businesses in a unique industry use our system to search for nearby businesses in industries they buy from, with the results seen in the following table:

| Buy from | Number Matching | Sell to | Number Matching |
|---|---|---|---|
| Industry A | 99 | Industry W | 98 |
| Industry B | 95 | Industry X | 92 |
| Industry C | 82 | Industry Y | 65 |
| Industry D | 47 | Industry Z | 24 |

From storing the results of these industry searches we store which industries the businesses in this industry buy from and sell to. Because we have historical information about the selling and buying behavior of each unique industry we are able to make recommendations to the users to consider new industries to buy from and sell to.

In the example shown above, less than one half of the businesses in this industry buy from Industry D, which may mean that these businesses are unaware that this industry is a supplier to other businesses in their industry and perhaps offers a good or service that will improve the quality/value of their good or service. Also, less than one quarter of the businesses in this industry sell to Industry Z which means this may be an untapped or new market that most businesses in the industry do not realize is a customer opportunity.

Our system is able to make recommendations based on the crowd-sourced information gathering of users on the website. We can recommend new or alternative suppliers and customers. This provides the business the opportunity to expand their customer base and increase revenue through unknown market opportunities. It also shows them potential new product/service providers to consider improving or reducing the cost of their offering.

This process creates a completely different process for creating a customer lead-generation list because it recommends potential customers the business had not been considering. In addition, our system creates visual lists of businesses of potential buyers and sellers that are geographically based. This provides spatial insights how to best serve existing customers and find new customers. It also shows visual information and lists about suppliers to buy from.

Data Reliability

Business data comes from over 3,000 data reporters that provide credit and trade information. This business data is supplemented through hundreds of public record sources as well through as commercial credit ratings. In addition, business-related data takes into account information compiled from white and yellow page directory data, directory services, municipal directories, security filings, and corporate annual reports. This data is similar to the type used by banks to research the credit-worthiness of a business for a loan or that companies use to evaluate the history and trustworthiness of another company with which they are considering doing business. Most of the business data in our system is proprietary. Industry business data is updated with current information each fiscal quarter, which means the competitiveness ranking of businesses and communities will be recalculated no less than four times each year.

Demographic, labor force, consumer, education, innovation, occupation, transportation, environmental, incentive, and entrepreneurship data comes from a wide range of public and private data sources including, but not limited to, the US Census, United States Postal Service, Bureau of Labor Statistics, Census Bureau estimates, Bureau of Economic Analysis, Medicare statistics, Internal Revenue Service, U.S. Patent and Trademark Office, Federal Aviation Office, US Environmental Protection Agency, US Department of Housing and Urban Development, ZoomProspector.com, and commercial data providers. Data is updated on a varying schedule depending on the dataset. Demographic data is updated annually with current year projections using appropriate data for most data points.

Because much of the data provided by public sources is not updated frequently enough to make real-time business decisions (such as Census 2000 data), data is projected to the present-year using appropriate projection methods. The methodology can follow rigorous quantitative analysis standards which follow best practices in statistics, economics, demography, geography, corporate site selection, and economic development. In addition, our system uses our proprietary methodology for analyzing information from all of the datasets.

Data Engine Processes

Producing a Benchmarking Report
Step 1: User-Entered Data is Received

A visitor to our website visitor will select an option to benchmark their individual business to its industry or competitors. On the website, a webpage with fields and forms is presented which allows the user to enter private information about their business. This includes, but is not limited to, the option to enter the business' location/address, annual revenue, number of employees, average salary per employee, year started, business ownership, business legal structure, growth status, industry, industries they buy from, industries they sell to, consumers/customer profile, if they plan to expand or relocate, if they need capital/money for their business, and the like. (for industry and customers we give them options to select from).

Step 2: User Account Created

The website visitor is prompted to set up a user account by entering their e-mail and by creating a password. By creating this user account the information they submit is stored in our database so that they don't have to re-enter their business data each time they return. In addition, by having a profile they will receive e-mails from us alerting them when their business benchmarking has changed due to updates of our national databases, as discussed further in Step 3. The terms "national database" and "universal database" will be used interchangeably in this patent application. The database includes business/industry data as discussed below. Of course our system can operate globally over more than one country or nation.

Step 2A: User-Data Sent to Community Rank Builder Engine (Separate Process)

In a separate flow of data analysis, the user-entered data is sent to the Community Rank Builder Engine. Here, the user's data is combined with the Business Data and the industry that the business is in is selected and all of the businesses in the nation in that industry are filtered from the universal database. By "combined" we mean, each of the data points requested by the business (industry, geography, report type, demographic, business characteristic, transportation, and many of the other possibly data points) are then used to filter all of the data in the national database. Basically, once we know the industry we search only the geographic (city, county, metro, state) data for that industry. Then we sort all of those geographies by the specific variable requested to be ranked such as "top revenue cities." Based on the industry and variable requested, demographic, business, geographic filters will generate the ranked list.

The Community Rank Builder Engine then creates multiple ranked lists for that specific industry across multiple business and industry variables for all geographic locations. Geographic units of measurement can include, but are not limited to, neighborhood, ZIP code, city, county, metropolitan area, region, state, national region, nation, multi-national trade treaty nations, continent, and world.

The resulting data outputs will include a ranked list of best cities (or other geography) for multiple variables for an industry. Examples of these variables are Best/Over-performing, under-served, top revenue, highest worker productivity, most employees, most businesses, most businesses per capita.

Step 3: User-Data Sent to Business Data Engine

The user data is then sent to our "Business Data Engine". The Business Data Engine primarily focuses on filtering and matching the industry data submitted by the user with the national database.

Turning now to the function of the business data engine, first, the industry that the business is in is selected and all of the businesses in the nation in that industry are filtered from the universal database. Second, the industry(s) that the business buys from is identified and all of the businesses in the nation in that industry(s) are filtered from the universal database. Third, B2B companies, the industry(s) that the business sells to is identified and all of the businesses in the nation in that industry(s) are filtered from the universal database. An additional process or alternative process for the industry(s) that the business sells to is, for B2C companies, to identify the consumers/customers that the business directly sells to. In this case, consumer spending data is filtered for the specific industry. In this regard, demographic, labor force, consumer, education, innovation, occupation, transportation, environmental, incentive, and entrepreneurship data comes from a wide range of public and private data sources including, but not limited to, the US Census, United States Postal Service, Bureau of Labor Statistics, Census Bureau estimates, Bureau of Economic Analysis, Medicare statistics, Internal Revenue Service, U.S. Patent and Trademark Office, Federal Aviation Office, US Environmental Protection Agency, US Department of Housing and Urban Development, ZoomProspector.com, and commercial data providers. Data is updated on a varying schedule depending on the dataset. Demographic data is updated annually with current year projections using appropriate data for most data points.

The data that the user submits for industries they buy from, sell to, or consumers they sell to is stored by our system and is associated with the industry of the user's business. What this data is then used for is to compare and enhance the search results of a future website user who has a business in this same specific industry.

Now that our system has a filtered list of the business' industry, the industry(s) it buys from, the industry(s) it sells to, and the customers it sells to, it also combines recommended alternative industries to buy from and sell to based on the previous searches of other website users.

All of these industries' data including all of the geographic referencing for all the businesses and all of the associated business characteristics and benchmarking variables for each business in each industry across the whole nation is then passed along into a consolidated business list.

Step 4: Filtered Business Industry Data is Sent to Data Analyzer Engine

In the Data Analyzer Engine the data filtered from the Business Data Engine is combined with Community and Demographic Data.

Based on the locations that the business operates, the Data Analyzer Engine filters and aggregates the community and demographic data specific to the business. For demographic and community data the system uses population statistics, occupational characteristics and consumer expenditures. There are many other data points that can be used, such as:
a. Population
b. Labor force Size (we actually use a variation of this in the current product but from the business database)
c. Job growth rate
d. Unemployment rate
e. Median age
f. Bachelors degree or higher, which can be sub-divided into type of degree
g. High school degree
h. White collar workers
i. Blue collar workers
j. Young and educated (age 25-34 with bachelors degree or higher)
k. Higher education facilities (vocational colleges, community colleges, universities)
l. Sole proprietors
m. Public companies
n. Patents issued
o. Venture capital invested
P. Venture capital businesses funded
q. Household expenditures
r. Household income
s. Home value
t. Commute time
u. Airport proximity
v. Nearest interstate
w. Nearest railroad
x. Federal incentive areas
y. Local incentive areas Many more can be added without departing from the spirit and scope of our invention.

The business and industry data is then measured relative to the quantitatively measured community characteristics of specific geographic areas of a hierarchical progression. This can include, but is not limited to, neighborhood, ZIP code, city, county, metropolitan area, region, state, national region, nation, multi-national trade treaty nations, continent, and world. Stated another way, compare the business' performance to the other businesses in its industry across multiple geographies. So we can show if it does better than businesses in its industry in its city, county, metro, state, and the nation.

For example, by combining business data such as the number of businesses in an industry or the revenue produced by an industry to community-related data such as population, consumer spending, or education levels, our system can calculate the relative concentrations and performance of a business and industry in a geographic area. Here we are bringing in the community and demographic data discussed above. At this stage what we are doing is creating the proportions which then tell us the relative performance of the business across many measurements (revenue, productivity, number of businesses, number of employees, and the like.). An example of how we do this is dividing the revenue of all businesses by the number of people in a community to know the "location quotient" of businesses revenue per capita. Other examples include the number of businesses per square mile, or revenue per business per college graduate, or many other combinations or combined calculations.

The combined business, industry, community, and demographic data is then compiled and sent to three more Engines and the data that is already prepared for the benchmarking report is sent to be used in the Benchmarking Report.

Step 5A: Filtered and Combined Data is Sent to the Heat Map Concentration Engine The filtered and combined data (from Step 4) is then sent to the Heat Map Concentration Engine. In this engine, industry-relevant data available through our system or the newly created data generated through the process of the user-submitted data, which can be measured proportionally through geographic areas, is then combined with a Geographic Information System (GIS), which are digital maps associated with data. What this means is to take the industry data and geo-code the data. This is a process of taking the known geographic information about a business such as the address or latitude/longitude and then matching it to the spatial data in the Geographic Information System. For example, in the GIS it knows how to plot the latitude/longitude of the business on the map or match the address to a line-segment representing the approximate street location. In addition, color/shape/numbering/etc. coding can used so as to map multiple data sets on the same map. This results in visually and distinctly mapping the separate groups of competitors, buyers, sellers, alternative buyers, and alternative sellers.

The combination of the data to the maps areas is then divided proportionally and the relative level of concentration is associated with a color scale creating a "heat map" with higher concentration areas having stronger or "hotter" color saturation. The meaning of "hotter" depends on different things depending on the variable. For example, hotter could mean that more people spend (showing areas which are technically "overserved", for example, restaurant spending in New York City or San Francisco is far above the national average). Conversely, if what we are measuring are the areas that are the most underserved, the hottest areas would be the places with the least spending. The meaning of heat is dependent on what we are measuring.

Proportions can be divided many different statistical ways including, but limited to, equal intervals, natural breaks, quantiles, or user-defined divisions.

For example, a heat map could show on a map the counties with the highest spending on clothing, the cities with the highest concentration of workers in a specific industry, ZIP codes with the highest revenue generation in an industry or other data visualizations.

Map areas or boundaries can take many forms including, but not limited to, census block groups, census tracts, neighborhoods, user-generated geographies, ZIP codes, city, county, metropolitan area, region, state, national region, nation, multi-national trade treaty nations, continent, and world.

Step 5B: Filtered and Combined Data is Sent to the Geo-Industry Engine

The filtered and combined data (from Step 4) is then sent to the Geo-Industry Engine. In this engine, the industry data for the company and the industries is buys from and sells to is combined with the Geographic Information System (GIS) data. The individual businesses in each category and industry are then plotted on a map. This map divides the businesses into:

Competitors (businesses in the same industry)
Vendors
Industries the business buys from (this can include multiple industries which are differentiated on the map)
Industries the business may alternatively buy from (this can include multiple industries which are differentiated on the map)

Customers
Industries the business sells to (this can include multiple industries which are differentiated on the map)
Industries the business may alternatively sell to (this can include multiple industries which are differentiated on the map)
A map is created as is a list of the businesses.
The map is one map with the three categories coded using color and other unique visual identifiers. This provides a spatial analysis showing the relative concentration of businesses by industry by function geographically. The map is interactive and it allows the website user to interactively click on the map to open new information about individual businesses.

The businesses are also listed by industry and function in separate lists. The businesses are listed individually with summary data about each business. The website user can then click on an individual business to link to detailed data about each individual business. Our core data is categorized by NAICS, SIC (Standard Industrial Classification, the precursor to NAICS), Yellow Pages, other business classifications, and our own associated keywords and industry classifications we have developed for industry verticals. Basically, our system uses a combination of existing best practice classifications and our own classifications with natural language search to deliver results. In addition, we developed a lookup table that determines that car, auto, and automobile all mean the same thing and are in the same category.

Step 5C: Filtered and Combined Data is Sent to the Strategy Recommendation Engine The filtered and combined data (from Step 4) is then sent to the Strategy Recommendation Engine. This data has each industry benchmarked across multiple business and industry characteristics (such as revenue, number of employees, employee productivity, and the like) and benchmarked geographically comparing many different geographic categories in which the business operates in using a hierarchical taxonomy. For example a business operates on, although not limited to, a street, neighborhood, city, county, metro, region, nation, and world.

Based on the relative position of the business compared to the performance of similar businesses in the industry at varying geographic levels our system uses mathematical algorithms to calculate all of the possible scenarios of how the business would relate to its industry across multiple geographies. Based on the resulting scenario our system generates a business recommendation for the company. The recommendations are calculated based on a variety of different scenarios mathematically which have been modeled using industry expertise of best business practices. For example, our system can make recommendations related to how the business should market itself, where to find more productive employees, where to expand, where to relocate, and when to partner with competitors.

In more detail, our algorithms comprise several steps. First, calculate all of the possible combinations of where a business would be positioned relative to all of the other geographies. For example, the business could be outperforming its city but underperforming its county and metro, but outperforming the state and nation (the number of possibilities grows exponentially as the number of geographic levels of measurements grow). Our system then breaks the calculation into two parts. The first part is about the business compared to the most local geographies (city, county, metro). The second part is a comparison to the bigger geographies (for example, state and nation). Then our system looks individually at what each of these combinations results in and, based on our expertise in understanding these issues, develops a recommendation. This is done for the small geographies and again for the larger geographies. Then our system puts the two parts together as one recommendation which consists of a title (coming from the second part) "Expand your market and consider relocation" and a longer paragraph of text that explains what someone should do.

For example:
Business revenue<City. Recommendation: Differentiate. Description: Your business generates less revenue than the average business in your industry in your city. To grow your business, consider ways to differentiate your company from your competition. Is your product or service faster, cheaper or better than the competition? If the answer is "yes", make sure your competitors' customers know you are better to give them a reason to buy from you.
City revenue<County. Recommendation: Expand/Relocate Locally. Description: Consider marketing your product or services to new customers outside of your city and in the surrounding county because a higher concentration of spending is happening in the businesses in your industry in your county than in your city.
County revenue>Nation. Recommendation: Increase Performance. Description: The revenue generation in your county is greater than the national average for your industry, so you may want to focus your efforts on succeeding within your area rather than expanding your marketing to farther away areas where spending is less.
Final recommendation: Differentiate, Expand/relocate Locally and Increase Performance. Description: Your business generates less revenue than the average business in your industry in your city. To grow your business, consider ways to differentiate your company from your competition. Is your product or service faster, cheaper or better than the competition? If the answer is "yes", make sure your competitors' customers know you are better to give them a reason to buy from you. Consider marketing your product or services to new customers outside of your city and in the surrounding county because a higher concentration of spending is happening in the businesses in your industry in your county than in your city. The revenue generation in your county is greater than the national average for your industry, so you may want to focus your efforts on succeeding within your area rather than expanding your marketing to farther away areas where spending is less.

Step 6: Producing the Benchmarking Report

The data, maps, lists and charts created in Steps 2A, 4, 5A, 5B, and 5C are then gathered and output to create a Benchmarking Report. This report includes, but is not limited to, benchmarking information such as multi-variable geographic industry benchmarking, business strategy recommendations, percentile performance, summary data, compete/buy/sell plotted business maps, compete/buy/sell business lists, maps, heat maps, local GIS data maps, and list of/link to best performing geographies.

This report is saved in the user's account.

Producing a Business to Competitor Benchmarking Report

Step 1: User-Entered Data for the Business is Received

A website visitor will go to our system and select an option to benchmark their individual business to its industry or competitors. On the website, a webpage with fields and forms is presented which allows them to enter private information about their business. This includes, but is not limited to, the option to enter the business' location/address, annual revenue, number of employees, average salary per employee, year started, business ownership, business legal structure, growth status, industry, industries they buy from, industries they sell to, consumers/customer profile, if they plan to expand or relocate, if they need capital/money for their business, and the like. (for industry and customers we give them options to select from).

The website user is then prompted to add a competitor on the next webpage screen.

Step 2: User-Entered Data for the Competitors is Received

The website visitor then is requested to add competitors for comparison. The process for adding competitor information is the same whether it is one competitor or multiple competitors so this step is simply repeated until all competitors have been added.

The website user has two ways to enter data for a competitor, Step 2 Option A and Step 2 Option B.

Step 2 Option A: User Enters Data they Know about the Competitor Business

In this option the business knows information about its competitors and enters this data directly into our system. This includes, but is not limited to, the option to enter the business' location/address, annual revenue, number of employees, average salary per employee, year started, business ownership, business legal structure, growth status, industry, industries they buy from, industries they sell to, consumers/customer profile, and the like.

Step 2 Option B: User Selects the Competitor Business Data Based on Our System Estimations In this option, if this business does not already know information about their competitors, they can search our system to find their competitors. To do this they have to enter data including the business' name and location. Based on the user-inputted data our system searches our national database of companies, using the search techniques described above, and then either returns the exact match or a list of similar matching records (for example, are be many Starbucks Coffee shops in Seattle). The user then selects the exact record that is the competitor.

Our system then imports the data estimations for that business into the data comparison and benchmarking process for that business.

Step 3: Data is Analyzed

Step 3 follows the same steps starting at Step 2A and continuing through Step 6 of "Producing a Benchmarking Report" except the same process is repeated for the business and each of its competitors.

Step 4: Producing the Business Competition Benchmarking Report

The Benchmarking Reports for each business are then combined and compared for each variable of measurement. This results in a side-by-side comparison of the performance of each business and the different businesses' geographies.

The output of this report is exactly the same as the Benchmarking Report except that the data is shown for each business next to the other businesses in the business characteristic variable being benchmarked.

This report is saved in the user's account.

Producing a Business to Alternative Geographies Benchmarking Report

Step 1: User-Entered Data for the Business is Received

A website visitor will go to our system and select an option to benchmark their individual business to its industry or competitors. On the website, a webpage with fields and forms is presented which allows them to enter private information about their business. This includes, but is not limited to, the option to enter the business' location/address, annual revenue, number of employees, average salary per employee, year started, business ownership, business legal structure, growth status, industry, industries they buy from, industries they sell to, consumers/customer profile, if they plan to expand or relocate, if they need capital/money for their business, and the like. (for industry and customers we give them options to select from).

The website user is then prompted to add a competitor on the next webpage screen.

Step 2: User-Entered Data for Alternative Geographies is Received

The website visitor then is requested to add additional geographies for comparison. The process for adding additional geographies information is the same whether it is one place or multiple places so this step is simply repeated until all geographies have been added.

To add an additional geography the user simply enters the name of the geography to compare. Our system then matches the request to its database of geographies and then also adds all larger (encompassing) geographies. For example, if a user enters the name of a city, our system also gathers the data for the county, metro, state and nation the city is located in.

Step 3: Data is Analyzed

Step 3 follows the same steps starting at Step 2A and continuing through Step 6 of "Producing a Benchmarking Report" except the same process is repeated for the business and each of its alternative geographies.

Step 4: Producing the Business to Alternative Geographies Benchmarking Report

The Benchmarking Reports for the business and the alternative geographies are then combined and compared for each variable of measurement. This results in a side-by-side comparison of the performance of each the business and the performance of businesses in the same industry in the different geographies.

The output of this report is exactly the same as the Benchmarking Report except that the data is shown for the business next to the alternative geographies for the business characteristic variable being benchmarked.

This report is saved in the user's account.

Scenario Modeling

For all of the benchmarking reports the user can edit data to create alternative analysis and calculations. For example the user can change the user-inputted data for its own company, change the data for its competitors, or change geographies for where it or its competitors are located. This provides the opportunity for the business to create alternative scenarios for business performance and geographic location.

Producing a Community Ranking Report

Step 1: User-Entered Data is Received

A website visitor will go to our system and select an option to create a Top 100 list of places. On the website, a webpage with fields and forms is presented which allows them to select the type of report for which they want a ranked geographic list.

Step 2: Selection of Geography

The user then enters the geographic area for which the report will be ranked. Geographic areas or boundaries can take many forms including, but not limited to, census block groups, census tracts, neighborhoods, user-generated geographies, ZIP codes, city, county, metropolitan area, region, state, national region, nation, multi-national trade treaty nations, continent, and world.

Step 3: Selection of Industry

The user then enters or selects the industry that they want compared for the ranked geographic list.

Step 4: Selection of Report Type

Then user then selects the type of report that they want for the comparison of geographies based on a list of options provided by our system or which they can create themselves based on our system's report wizard. For example, they may want to know the places with the highest total business revenue, the highest performing, the most underserved, highest worker productivity, most employees, most businesses, and the like.

Step 5: Optional Demographic and Community Filter

The user will also have the option to sort the ranked list by demographic, geographic and community characteristics.

In this case, they will open up a webpage that gives them the ability to set filters on the types of community that will be returned on the ranked list. For example, the user could filter the results to just Texas, places with populations over 75,000 people, with 25% or more of the population having bachelor's degrees, places with airports, homes costing less than $200,000, or some other demographic, geographic or community variable used for filtering.

Step 6: Community Ranking Report Produced

Based on the geographic measurement, industry, report type and community filters our system produces a ranked report of the places based on quantitative performance. The list is interactive and all locations are hyperlinks into detailed community profiles of the place.

This report can be saved in the user's account.

The invention claimed is:

1. A system comprising:
   a computer implemented geographic information mapping system having a processor and memory and software so that the processor is configured to store, in a database connected to the computer implemented geographic information mapping system, graphic information system data including demographic and community data;
   a computer having a processor and a graphical user interface, connected to the computer implemented geographic information mapping system, wherein the processor is configured to enter information for a first business into the database in the geographic information mapping system, the first business information including two or more of a name and industry of the first business, business statistics of the first business, contact information for the first business, plans to expand for the first business, plans to relocate for the first business and a need for capital of the first business; and
   wherein the processor of the computer implemented geographic information mapping system is further configured to search, using a data engine of the computer implemented geographic information mapping system, for an identified industry for the first business based on the first business information in the database, generate, using a community rank builder engine of the computer implemented geographic information mapping system, one or more ranked lists for a particular industry based on the first business information and the graphic information system data, filter and match, using a business data engine of the computer implemented geographic information mapping system, the industry of the first business against the graphic information system data to generate filtered first business data, combine, using a data analyzer engine of the computer implemented geographic information mapping system, the filtered first business data and the demographic and community data to generate demographic and community data specific to the first business updated to the database, and generate, using a strategy recommendation engine of the computer implemented geographic information mapping system, a recommendation, presented to a user using the graphical user interface of the computer, for the first business based on the demographic and community data specific to the first business.

2. The system of claim 1, wherein the geographic information mapping system further comprises a heat map concentration engine that measures the demographic and community data specific to the first business in geographic areas to generate a heat map for the first business and a geo industry engine that generates a map of the first business and one or more competitors of the first business, one or more vendors of the first business, one or more industries from which the first business buys and one or more customers of the first business.

3. The system of claim 1, wherein the strategy recommendation engine generates advertisement recommendations specific to the first business.

4. The system of claim 1, wherein the data engine of the geographic information mapping system is further configured to generate a benchmarking report for the first business based on the generated recommendation for the first business.

5. The system of claim 1, wherein the data engine of the geographic information mapping system is further configured to generate a business to competitor benchmarking report based on the generated recommendation for the first business and generated demographic and community data specific to a competitor.

6. The system of claim 1, wherein the data engine of the geographic information mapping system is further configured to generate a business to alternative geographies benchmarking report based on the generated recommendation for the first business.

7. The system of claim 1, wherein the strategy recommendation engine accepts modification of the data for the first business to determine alternative scenario recommendations for the first business.

8. The system of claim 1, wherein the geographic information mapping system further comprises a community rank builder engine that generates a community ranking report that compares one or more businesses in an industry in a particular geographic location.

9. The system of claim 3, wherein the advertising recommendations further comprise one of a recommendation of geographic locations in which to place advertisements, a recommendation about how to advertise, a recommendation for direct mailing advertisement and a recommendations about third parties who can provide advertising for the first business.

10. A computer implemented method for improving business performance including future scenario modeling using a geographic information mapping system that stores, in a database, graphic information system data including demographic and community data, the method comprising:
   providing, using a computer having a graphical user interface connected to the geographic information mapping system, information for a first business that is stored in a database of the geographic information mapping system, the first business information including two or more of a name and industry of the first business, business statistics of the first business, contact information for the first business, plans to expand for the first business, plans to relocate for the first business and a need for capital of the first business;

searching, using a data engine of the geographic information mapping system, in the database of the geographic information mapping system, for an identified industry for the first business based on the first business information;

generating, using a community rank builder engine of the geographic information mapping system, one or more ranked lists for a particular industry based on the first business information and the graphic information system data;

matching, using a business data engine of the geographic information mapping system, the industry of the first business against the graphic information system data to generate filtered first business data;

generating, using a data analyzer engine of the geographic information mapping system, demographic and community data specific to the first business using the filtered first business data and the demographic and community data;

updating the database of the geographic information mapping system to store the demographic and community data specific to the first business;

generating, using a strategy recommendation engine of the geographic information mapping system, a recommendation for the first business based on the demographic and community data specific to the first business; and displaying, on the graphical user interface of the computer, the generated recommendation.

11. The computer implemented method of claim 10 further comprising generating, using a heat map concentration engine of the geographic information mapping system, a heat map for the first business based on the demographic and community data specific to the first business in geographic areas and generating, using a geo industry engine of the geographic information mapping system, a map of the first business and one or more competitors of the first business, one or more vendors of the first business, one or more industries from which the first business buys and one or more customers of the first business.

12. The computer implemented method of claim 10 further comprising generating, using the strategy recommendation engine, advertisement recommendations specific to the first business.

13. The computer implemented method of claim 10 further comprising generating, using the data engine, a benchmarking report for the first business based on the generated recommendation for the first business.

14. The computer implemented method of claim 10 further comprising generating, using the data engine, a business to competitor benchmarking report based on the generated recommendation for the first business and generated demographic and community data specific to a competitor.

15. The computer implemented method of claim 10 further comprising generating, using the data engine, a business to alternative geographies benchmarking report based on the generated recommendation for the first business.

16. The computer implemented method of claim 10 further comprising determining, using the data engine, an alternative scenario for the first business based on modification of the data for the first business.

17. The computer implemented method of claim 10 further comprising generating, using a community rank builder engine, a community ranking report that compares one or more businesses in an industry in a particular geographic location.

18. The computer implemented method of claim 12, wherein generating the advertising recommendations further comprise generating one of a recommendation of geographic locations in which to place advertisements, a recommendation about how to advertise, a recommendation for direct mailing advertisement and a recommendations about third parties who can provide advertising for the first business.

* * * * *